United States Patent Office

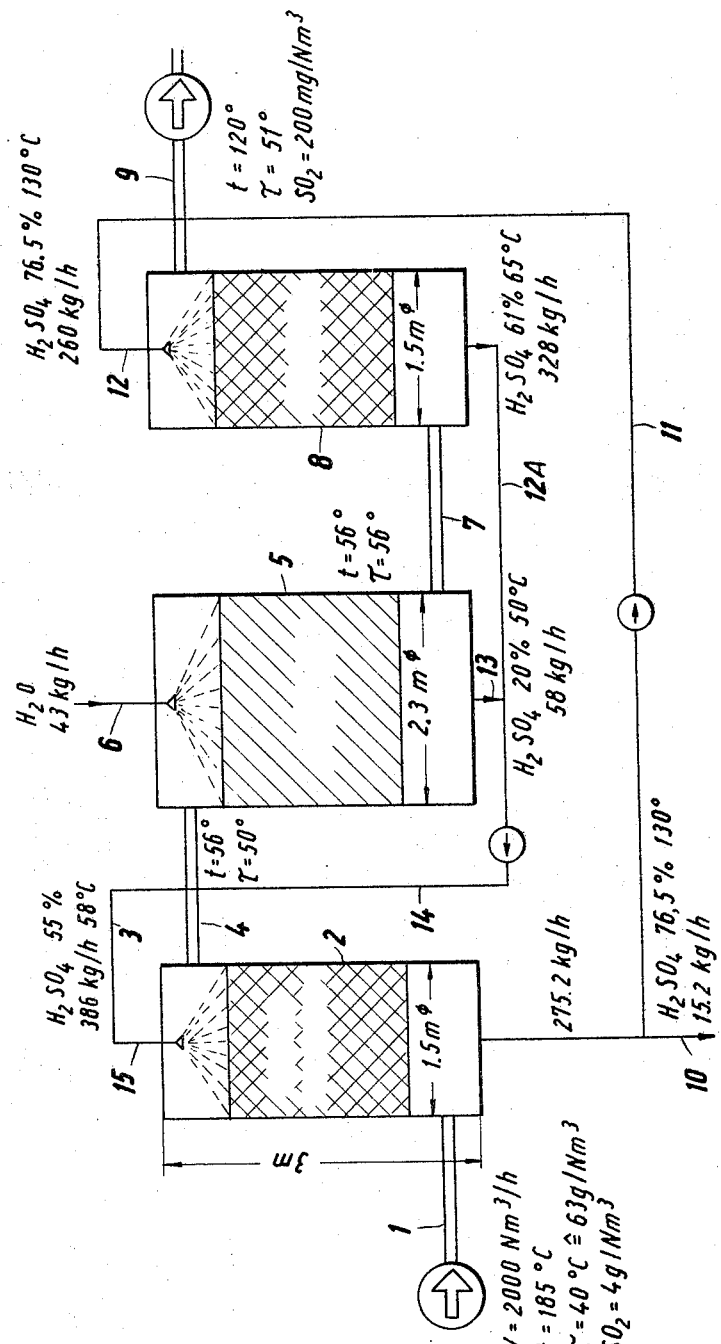

3,294,487
Patented Dec. 27, 1966

3,294,487
PROCESS FOR PRODUCING SULPHURIC ACID
Egon F. M. Pauling, Essen, Germany, assignor to Metallgesellschaft Aktiengesellschaft, Frankfurt am Main, Germany
Filed June 16, 1964, Ser. No. 375,601
8 Claims. (Cl. 23—168)

This invention relates to an improved process for preparing sulfuric acid from gases containing $SO_2$.

Copending application Serial No. 142,782, filed October 4, 1961, now abandoned, which is incorporated herein by reference, describes and claims a process for producing sulfuric acid wherein gaseous sulphur dioxide is catalytically reacted with oxygen in the presence of water at a temperature below about 120° C., and wherein the gas is brought into contact with an adsorbent which is impregnated with a catalyst. Among the adsorbents useful in this process are active carbon, semicoke, meerschaum or the like, and the catalyst added may be present in a quantity between 1 and 500 grams per metric ton. This method gives the best results at relatively low temperatures, i.e., at temperatures below 120° C., preferably at a temperature of about 70° C., and at relatively low $H_2SO_4$ concentrations at the adsorbent, the optimum temperature being between 45 and 70° C.

For the optimum performance of this process, it is therefore advisable to introduce the $SO_2$ containing gases into the catalyst composition comprising the adsorbent and catalyst at low temperature, preferably at a reaction temperature of below 100° C., particularly between 45 and 70° C. At the same time, it is advisable to ensure that the humidity of the gases reaching the catalyst composition is high, because otherwise excessively large quantities of water or of dilute sulphuric acid must be trickled over the catalyst composition. The converted gas leaving the catalyst composition is substantially completely free of $SO_2$ but it also is at low temperature and is very humid. It cannot therefore be discharged to the atmosphere without further treatment since the cold wet exhaust gases would quickly sink near the exaust stack and cause dangerous contamination of the surrounding area.

For economic reasons the remedy of heating these exhaust gases in the usual manner from 50° to 120° C. is frequently prohibitive. To heat these desulphurized gases would require about an additional 45 to 50 kg. of fuel oil in the process, a requirement which is generally unacceptable on account of the cost.

The $SO_2$ containing gases which are treated according to the process described in the aforesaid patent application usually result from other production stages or processes at a temperature which exceeds the most economical temperature for converting $SO_2$ into $H_2SO_4$. Also the humidity of these gases is lower than that required for optimum conversion to $H_2SO_4$.

Accordingly, an object of the present invention is to provide an improvement of the process described in the aforesaid application which permits the moisture content of the desulphurized exhaust gas to be lowered very economically without the use of any external heat sources and its temperature to be raised sufficiently to allow the gas to be discharged to the atmosphere without causing dangerous contamination of the surrounding area.

The present invention therefore comprises cooling and humidifying the starting $SO_2$ containing gases, which are too dry and too hot, by first directly contacting them with dilute sulphuric acid thereby lowering their temperature and raising their water content or humidity to optimum levels for subsequent conversion to $H_2SO_4$. A dilute sulphuric acid which is readily available for this purpose is that produced at the catalytic conversion stage of the process. A relatively concentrated and hot sulphuric acid is obtained from this pretreatment step which can then be used for drying and reheating the exhaust gases which leave the catalyst stage after $SO_2$ removal and conversion.

More particularly, according to the present invention the process for the production of sulphuric acid from sulphur dioxide containing gas having a temperature above 140° C. comprises the steps of cooling the starting $SO_2$ containing gas to a temperature below 120° C., preferably between 45 and 70° C., and humidifying it by directly contacting it with dilute sulphuric acid, reacting the resulting gas with oxygen in the presence of water by contacting the gas with an adsorbent which is impregnated with a catalyst thereby converting the sulphur dioxide into sulphuric acid, and drying and heating the gas resulting from the reaction stage by contacting it with the hot concentrated sulphuric acid obtained from the cooling and humidifying stage.

The dilute sulphuric acid employed in the initial cooling and humidifying stage is preferably introduced at a temperature of 40 to 70° C. and a concentration between 45 and 65% $H_2SO_4$.

The latter stage of preheating and drying the exhaust gases is also performed by direct contact, eliminating the need for an indirect heat exchange means. Accordingly, corrosion and heat transfer problems do not arise which would otherwise be unavoidable due to the high chemical reactivity of the two components, the relatively low available temperature differential and the consequent unfavourable heat transmission factors.

The hot concentrated sulfuric acid employed in this preheating and drying stage is preferably introduced at a temperature of at least 110° C., e.g., about 130° C., and at a concentration of at least 70% $H_2SO_4$, e.g., about 75%.

The invention is hereinafter described by example in greater detail with reference to the accompanying drawing which illustrates a schematic flow diagram of the invention.

EXAMPLE 1

Referring to the drawing, 2000 cubic meters per hours of gas at standard temperature and pressure (S.T.P.), from the combustion of a fuel oil, at a temperature of 185° C., having a dew point of 40° C. and an $SO_2$ content of 4 grams per cubic meter (S.T.P.), were passed through pipe 1 into cooler-concentrator 2 which was 3 meters high and had a diameter of 1.5 meters. 386 kilograms per hour of a 55% sulphuric acid were introduced through pipe 3 and sprayer 15 at a temperature of 58° C. into the cooler-concentrator. The cooled and prehumidified gas emerging at a temperature of 56° C. and having a dew point of 50° C. was then passed through pipe 4 to reactor 5 which had a diameter of 2.3 meters and a height of 3 meters. 43 kilograms per hour of water were sprayed into the reactor from sprayer 6. The gas from which the $SO_2$ had been substantially removed left the reactor 5 through pipe 7 at a temperature of 56° C., its dew point being 56° C. This was introduced into dryer 8 which had a diameter of 1.5 meters and a height of 3 meters. The dried exhaust gas, freed of $SO_2$, which had a temperature of 120° C., a dew point of 51° C. and an $SO_2$ content of 200 milligrams per cubic meter (S.T.P.) was then discharged to the atmosphere through line 9. In the cooler-concentrator 2, 285.2 kilograms per hour of a sulphuric acid containing 76.5% $H_2SO_4$ resulted at a temperature of 130° C. 15.2 kilograms per hour of this acid were withdrawn through pipe 10 and 260 kilograms per hour were introduced through pipe 11 and sprayer 12 into dryer 8. 328 kilograms per hour of a 61% sulphuric acid at 65° C. were obtained in dryer 8. This sulphuric acid was withdrawn through pipe 12a and combined with the dilute sulphuric acid containing 20% of $H_2SO_4$ obtained from the reactor 5 and withdrawn through pipe 13 at the rate of 58 kilograms per hour and at a temperature of 50° C. The mixture of these two acids, corresponding to 386 kilograms per hour of a sulphuric acid containing 55% of $H_2SO_4$ at a temperature of 58° C., was introduced via pipe 14 and sprayer 15 into the cooler-concentrator 2.

I claim:

1. A process for the production of sulphuric acid from hot, dry sulfur dioxide containing gas comprising the steps of in a first stage intimately contacting sulfur dioxide containing gas directly with dilute sulphuric acid thereby cooling the gas to a temperature of about 45 to 100° C. and also thereby humidifying the gas; thereafter in a second stage contacting the gas resulting from the first stage with a catalyst impregnated in a solid absorbent in the presence of water and oxygen, thereby converting the sulfur dioxide present to sulphuric acid; and in a third stage contacting the gas resulting from the said second stage with hot concentrated sulphuric acid resulting from the first stage, thereby drying and heating the gas resulting from the second stage.

2. A process as in claim 1 wherein in the first stage the sulphuric acid is introduced at a temperature between 40 and 70° C. at a concentration of between 45 and 65% $H_2SO_4$.

3. A process as in claim 1 wherein in the third stage the hot concentrated sulphuric acid is introduced at a temperature of at least 110° C. and a concentration of at least 70% $H_2SO_4$.

4. A process as in claim 1 wherein the dilute cooled sulphuric acid resulting from the second stage is introduced as the dilute sulphuric acid in the first stage.

5. A process as in claim 1 wherein part of the sulphuric acid formed in the process is separated as the product from the first stage.

6. In a process for the production of sulphuric acid from $SO_2$ containing gas, the steps comprising:
   (a) introducing about 2000 cubic meters per hour of said $SO_2$ containing gas at a temperature of about 185° C., having a dew point of about 40° C. and an $SO_2$ content of about 4 grams per cubic meter into a first stage,
   (b) intimately and directly contacting said $SO_2$ containing gas in said first stage with about 386 kilograms per hour of dilute sulphuric acid at a temperature of about 58° C. and having a concentration of about 55% $H_2SO_4$, thereby cooling and humidifying the $SO_2$ containing gas to about 56° C. and a dew point of about 50° C. and producing about 275 kilograms per hour of sulphuric acid at a temperature of about 130° C. and a concentration of about 76%,
   (c) introducing the $SO_2$ containing gas resulting from said first stage into a second stage and therein intimately and directly contacting it with an $SO_2$ conversion catalyst impregnated in an absorbent and about 43 kilograms per hour of water, thereby producing about 58 kilograms per hour of sulphuric acid at a temperature of about 50° C. and a concentration of about 20% $H_2SO_4$,
   (d) passing the gas resulting from the said second stage at a temperature of about 56° C. and a dew point of about 56° C. into a third stage and therein intimately and directly contacting it with about 260 kilograms per hour of the sulphuric acid resulting from the said first stage, thereby heating and drying the exhaust gases from the said second stage to a temperature about 120° C. and a dew point of about 51° C.,
   (e) combining the sulphuric acid resulting from said second and third stages and introducing it as the dilute sulphuric acid of said first stage,
   (f) exhausting the gas resulting from said third stage to the atmosphere and recovering about 15 kilograms per hour of about 76% $H_2SO_4$ from said first stage.

7. A process as in claim 1 wherein the process is carried out in a continuous manner.

8. In a process for the production of sulfuric acid from hot, dry gas containing a minor proportion of $SO_2$, the steps comprising:
   (a) introducing said hot, dry gas at a temperature above about 140° C. into a first stage,
   (b) ultimately and directly contacting said hot, dry gas in the first stage with dilute sulfuric acid which is at a temperature of about 40° to 70° C. and has a concentration between about 45 to 65% $H_2SO_4$ thereby cooling and humidifying the hot, dry gas to about 45 to 100° C. and producing sulfuric acid at a temperature of at least about 110° C. and a concentration of at least about 70% $H_2SO_4$,
   (c) introducing the gas resulting from said first stage into a second stage and therein intimately and directly contacting it with an $SO_2$ conversion catalyst impregnated in an absorbent in the presence of oxygen while spraying water onto the absorbent, thereby producing dilute sulfuric acid,
   (d) passing the gas resulting from said second stage into a third stage and therein intimately and directly contacting it with part of the sulfuric acid resulting from said first stage thereby drying and heating the exhaust gas from said second stage,
   (e) combining the sulfuric acid resulting from said second and third stages and introducing it as the dilute sulfuric acid of said first stage,
   (f) exhausting the gas resulting from said third stage to the atmosphere and recovering sulfuric acid from said first stage at a concentration of at least about 70% $H_2SO_4$.

References Cited by the Examiner

UNITED STATES PATENTS 2,539,519  1/1951  Melendy _____ 23—167

FOREIGN PATENTS 854,205  10/1952  Germany.

OTHER REFERENCES

Copson et al., Industrial and Engineering Chemistry, vol. 25, No. 8, pages 909–916.

OSCAR R. VERTIZ, Primary Examiner.

BENJAMIN HENKIN, Examiner.

R. M. DAVIDSON, A. GREIF, Assistant Examiners.